April 13, 1926.  1,580,312
J. F. LONG
COMBINED PLUG VALVE AND HOSE CONNECTION
Filed April 6, 1925

Inventor
J. F. Long.
By
Long & Long, Attorneys

Patented Apr. 13, 1926.

1,580,312

UNITED STATES PATENT OFFICE.

JAMES F. LONG, OF SAN ANTONIO, TEXAS.

COMBINED PLUG VALVE AND HOSE CONNECTION.

Application filed April 6, 1925. Serial No. 21,020.

*To all whom it may concern:*

Be it known that I, JAMES F. LONG, a citizen of the United States, residing at San Antonio, in the county of Bexar and State of Texas, have invented certain new and useful Improvements in Combined Plug Valves and Hose Connections, of which the following is specification.

This invention relates to combined plug valves and hose connections and has as its object to overcome the many disadvantages which are presented by the ordinary connections employed in attaching garden and other hose to water supply pipes or valves.

Ordinarily, a garden hose is provided with a rotatably mounted or swiveled nipple which must be screwed onto the outlet branch of a valve or onto the threaded end of a water supply pipe, if the cut-off valve is located at a distance from the point of connection of the hose with the pipe. This requires the employment of a wrench and considerable time is lost in making the connection and likewise a certain amount of labor is involved. Furthermore, the packing gaskets which are arranged in such a coupling require to be frequently replaced. Likewise, it is necessary to shut off the water supply before connecting the hose and, on the other hand, to turn on the supply after the hose has been connected. In consideration of the foregoing the invention has as one of its important objects, to provide a combined plug valve and coupling of such construction and embodying such an arrangement of parts that the member of the device which is connected to the hose, need only be inserted into the valve and rotated a part of a revolution to effect both a turning on of the water supply and a secure and firm connection between the parts.

Another object of the invention is to render unnecessary the use of any tool of any description for the purpose of effecting a secure and water-tight connection between the hose carrying member of the coupling and the valve member thereof, and, at the same time, obviate the slow and tedious procedure of threading together the parts of a coupling.

Another object of the invention is to provide a combined plug valve and hose coupling which may be installed in connection with any ordinary fluid supply pipe and a hose and which structure will be substantial and durable and not liable to any disarrangement of the parts, leakage, or the accumulation of dirt and other foreign matter which might obstruct the free flow of fluid or render the coupling difficult to manipulate.

Figure 1:
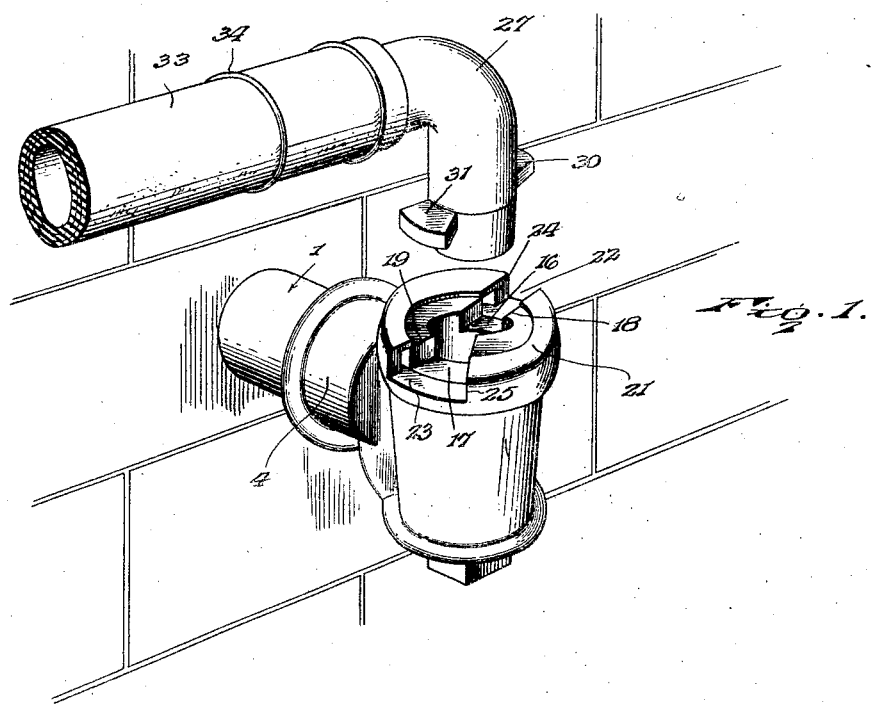
Figure 1 is a perspective view of the combined plug valve and coupling embodying the invention, the component parts of the structure being shown relatively separated but so disposed as to be joined.
Figure 2:
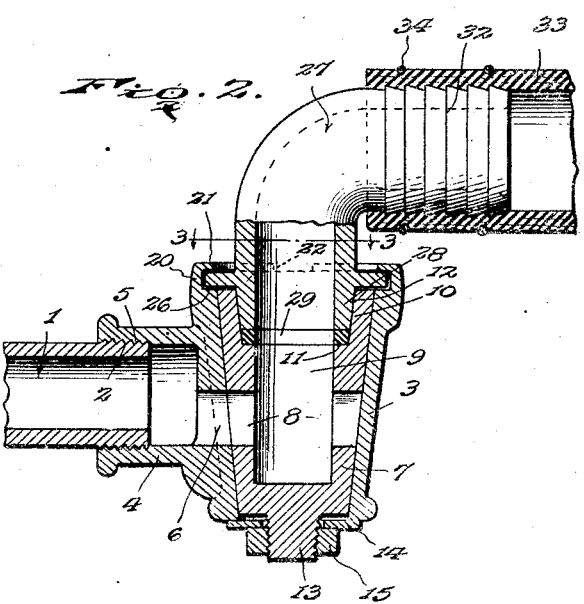
Figure 2 is a vertical diametric sectional view through the device.
Figure 3:
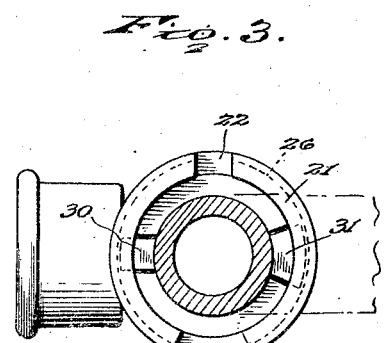
Figure 3 is a horizontal sectional view taken substantially on the line 3—3 of Figure 2, looking in the direction indicated by the arrows.

The device embodying the present invention may be employed wherever it is desired to connect a flexible hose to a water or other fluid supply pipe and, therefore, the illustration of Figure 1 is not to be considered as limiting the use of the device in the precise manner shown. In the drawings, a water supply pipe is indicated by the numeral 1 and may project from the wall of a building or it may be an upright pipe or a pipe arranged in any position found most convenient, and the said pipe is externally threaded as indicated by the numeral 2, for the application thereto of the valve part of the structure embodying the invention, as will now be explained. The device embodying the invention comprises two sections, one in the nature of a plug valve and the other in the nature of an actuating member for the valve and constituting also means for connecting a hose to the valve. The first mentioned section comprises a valve casing which is indicated by the numeral 3 and is provided with a laterally extending branch 4 interiorally threaded as at 5, to fit the threads 2 of the water supply pipe 1, a port 6 being provided in the wall of the valve casing to establish communication between the interior of the plug within the casing and the said branch. The plug is indicated by the numeral 7 and is of tapered or conical form so as to fit rotatably in the conical chamber of the casing 3. The said plug is formed with ports 8, either of which may be brought into registration with the port 6, in the rotation of the plug 7, these ports being located at opposite sides of a chamber 9 formed within the said plug. The chamber 9 is preferably of substantially cylindrical form and the wall of the chamber near the upper end of the plug is circumferentially recessed as at 10, so as to provide a shoulder 11 extending circumferentially of the said wall and horizontally disposed, and also a conical wall portion 12 which surrounds the said shoulder. The plug 7 is provided at its lower end with a threaded stud 13 onto which is fitted a washer 14 and a nut 15 which latter may be tightened so as to cause the washer 14 to bind against the lower end of the casing 3 and thus hold the plug snugly within the chamber of the casing. At diametrically opposite sides of its open upper end, the plug 7 is formed with notches indicated one by the numeral 16 and the other by the numeral 17. These notches are of different widths, the notch 16 being of less width than the notch 17 and having substantially parallel side walls 18. The notch 17 has side walls 19 which are located in outwardly diverging planes. The wall of the casing 3 is formed at its upper end with an upstanding circumferential flange 20 having an inwardly projecting overhanging lip 21, and the said flange and lip are formed at diametrically opposite sides of the casing with notches 22 and 23, the notch 22 being of less width than the notch 23 and having parallel side walls 24, and the notch 23 having outwardly diverging side walls 25. By reference to Figure 1 of the drawings, it will be observed that in one position of rotation of the plug 7, the notches 16 and 17 will register respectively with the notches 22 and 23. It will also be observed by reference to this figure and Figures 2 and 3, that the upper end of the plug 7, as a whole, is of a diameter slightly less than the diameter of the opening described by the inwardly presented edge of the overhanging lip 21, so that by removing the nut 15 and the washer 14, the plug may be easily removed from the valve casing if occasion requires. It will also be observed by reference to these figures that an arcuate channel 26 is formed by the upper end of the valve casing 3, the flange 20, and the overhanging lip 21, and the purpose of this channel will presently be set forth.

The member of the device which is attached to the hose is indicated in general by the numeral 27 and is shown as an elbow but may be a straight section of pipe which, at one end, is tapered, as indicated by the numeral 28, so as to fit more or less snugly into the tapered upper portion 12 of the valve plug 7, a packing gasket 29 being disposed upon the shoulder 11 and engaged by the lower end of the tapered portion 28 of the said hose-attaching device. At the upper end of the tapered portion 28, the section is formed at diametrically opposite sides with lugs indicated one by the numeral 30 and the other by the numeral 31, the lug 30 being of dimensions to adapt it to be fitted into the notch 22 and the notch 16, and the lug 31 being of dimensions to be received within the notches 17 and 23. The length of the lugs 30 and 31 is such that when the tapered end of the elbow 27 is fitted in the upper end of the valve plug 7, the said lugs 30 and 31 may be seated in the notches 16 and 17 with their outer end portions overlying the bottoms of the notches 22 and 23 respectively and with their said outer ends nearly touching the circle described by the inner surface of the flange 20. By a slight downward pressure the lower end of the tapered portion 28 of the coupling section 27 may be brought into snug engagement with the packing washer 29, whereupon the section may be rotated through one-quarter of a turn so as to cause the lugs 30 and 31 to ride beneath the overhanging lip 21 of the flange 20, as clearly illustrated in Figures 2 and 3 of the drawings. This rotation of the section 27 will, of course, result in a rotation of the valve plug 7 to such position that one of the ports 8 will register with the port 6 and therefore at the time the coupling section is connected with the valve part of the device, the flow of water is automatically turned on. Likewise, when the coupling is rotated in the opposite direction to its original position, the plug 7 will be rotated to such position that the port 8 will be out of registration with the port 6 and the flow will be cut off. The outer end of the section 27 is formed with a number of circumferential corrugations indicated by the numeral 32, and the numeral 33 indicates a hose which is fitted onto this end of the section and securely held in place by binding wires 34 secured about its said end. It will, of course, be evident that the engagement of the lugs 30 and 31 beneath the lip 21 will serve to maintain the elbow 27 securely connected with the valve member of the device so that these parts cannot become separated. It will likewise be evident that it is wholly unnecessary to employ any tool for the purpose of connecting the two parts of the device or disconnecting the same.

Another advantage presented by the structure is, that when the hose is disconnected, the valve cannot be conveniently turned on by children as may be done, however, where an ordinary hydrant valve is employed and an ordinary hose is attached thereto in the usual manner.

While the diametrically opposite notches and lugs are shown and described as having different forms, they may all be of the same form. While I have described the device particularly in connection with a garden hose, it may be used wherever a hose is to be connected to a pipe for delivering a fluid of any kind through a valve, and the coupling portion of the invention may be employed for engaging an electric lamp bulb in its socket.

Having thus described the invention, what I claim is:

1. The combination with a casing having a port and an inner arcuate channel, and a valve plug in the casing having a port to register with the port of the casing and chambered, and having a notch forming an opening extending through the end and sides of the plug, of a coupling member adapted to be fitted to the plug and connected with the chamber thereof, and having a lateral lug to enter the opening of the plug and projecting beyond the outer side thereof and engage the channel of the casing and retain the parts in operative position.

2. The combination with a casing having a port and an inner arcuate channel, and an axially chambered valve plug within the casing and provided with a port leading from the chamber to register with the port of the casing, and having a notch forming an opening extending through the end and sides of the plug, of an axially chambered coupling member adapted to have an end portion snugly fit within the chambered end of the plug, and having a lateral lug to enter the opening of the plug and project beyond the outer side thereof to engage the channel of the casing and secure the parts in operative position.

3. The combination with a casing having a lateral port and an inner channel, and having notches forming openings leading outwardly from the channel, and a valve plug secured within the casing and having a lateral port and an axial outwardly opening chamber and notched in its outer end to register with the notches of the casing, of a coupling member having an end portion adapted to fit within the outer chambered end of the plug, and having lateral lugs to enter the notches of the plug and project beyond the outer side thereof to enter the notches of the casing and engage the said channel and secure the parts when operatively assembled.

4. A combined plug valve and hose connection comprising a valve unit including a casing having an inlet port, a hollow valve plug rotatably fitted in the casing and having a port for registration with the said inlet port in one position of rotation of the said plug, the said plug being increased in internal diameter at its open upper end to provide a shoulder and above the shoulder being interiorly tapered in a downward direction, the casing being provided at its open upper end with a circumferential flange having an inwardly projecting overhanging lip, a packing washer seated upon the shoulder formed by the interior enlargement of the upper portion of the plug, and a hose unit having a tapered inlet end fitted into the tapered interiorly enlarged upper end of the said plug with its lower end engaging the said packing washer, the other end of the unit being turned at an angle and adapted for the connection of a hose thereto, the said flange and lip of the casing and the upper end of the said plug being provided at diametrically opposite sides with notches of unlike dimensions and contour at each respective side of the valve unit and adapted to be brought into registration in one position of rotation of the said plug, and lugs upon diametrically opposite sides of the inlet end of the hose unit, one of said lugs being of dimensions and contour to engage in one set of notches in the valve unit and the other lug being of shape and dimensions to engage in the other notches of the valve unit, the said lugs being arranged to engage beneath the said lip of the valve casing when the plug is rotated to one position through rotation of the said hose unit whereby to lock the hose unit with respect to the casing and against withdrawal from the plug.

In testimony whereof I affix my signature.

JAMES F. LONG. [L. S.]